(12) United States Patent
Foster et al.

(10) Patent No.: US 8,348,797 B2
(45) Date of Patent: Jan. 8, 2013

(54) HYDRAULIC CLUTCH CONTROL SYSTEM

(75) Inventors: Michael D. Foster, Carmel, IN (US); Jy-Jen F. Sah, West Bloomfield, MI (US); Peter E. Wu, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1098 days.

(21) Appl. No.: 12/265,758

(22) Filed: Nov. 6, 2008

(65) Prior Publication Data

US 2009/0253544 A1 Oct. 8, 2009

Related U.S. Application Data

(60) Provisional application No. 61/042,386, filed on Apr. 4, 2008.

(51) Int. Cl.
*F16H 31/00* (2006.01)

(52) U.S. Cl. .............................. 475/116; 475/127
(58) Field of Classification Search ............... 475/137, 475/279, 286, 290
See application file for complete search history.

(56) References Cited

U.S. PATENT DOCUMENTS 6,299,560 B1 * 10/2001 Fujioka et al. ............... 475/119
7,395,837 B2    7/2008 Foster et al.

* cited by examiner

*Primary Examiner* — Justin Holmes
*Assistant Examiner* — Derke D Knight
(74) *Attorney, Agent, or Firm* — Quinn Law Group, PLLC (57) ABSTRACT

A transmission includes two blocking valves that control fluid pressure to a plurality of clutches. The blocking valves are characterized by a plurality of states that result in at least three transmission operating conditions. Each of the three operating conditions is characterized by fluid pressure being unavailable to a respective one of the plurality of clutches.

10 Claims, 6 Drawing Sheets

| | C1 | C2 | C3 | C4 |
|---|---|---|---|---|
| MODE 1 | X | | | |
| G1 | X | | X | X |
| MODE 2 | X | | | X |
| G2 | X | X | | X |
| MODE 3 | | X | | X |
| G3 | | X | X | |
| MODE 4 | | | X | |

FIG. 9

| | N/C PCS C1 | N/O PCS C2 | N/C PCS C3 | N/O PCS C4 | X Blk | Y Blk | NEUTRAL |
|---|---|---|---|---|---|---|---|
| ALL AVAILABLE | C1 | C2 | C3 | C4 | 1 | 1 | |
| M3/G3/M4 | ~~C1~~ | C2 | C3 | C4 | 0 | 1 | |
| M1/G1/M2 | C1 | ~~C2~~ | C3 | C4 | 1 | 0 | |
| M2/G2/M3 | C1 | C2 | ~~C3~~ | C4 | 0 | 0 | |

HYDRAULIC CLUTCH CONTROL SYSTEM

CROSS-REFERENCE TO RELATED APPLICATIONS

This application claims the benefit of U.S. Provisional Application No. 61/042,386, filed Apr. 4, 2008, and which is hereby incorporated by reference in its entirety.

TECHNICAL FIELD

This invention relates to hydraulic control systems for vehicular transmissions.

BACKGROUND OF THE INVENTION

In general, a motor vehicle transmission includes an input shaft and an output shaft. The input shaft is typically coupled to the vehicle engine through a fluid coupling such as a torque converter, and the output shaft is coupled to the vehicle drive wheels through a differential gear set. The transmission employs a number of gear elements and selectively engageable friction elements (referred to herein as clutches) that are controllable to vary the speed ratio between the transmission input and output shafts.

Transmissions are typically characterized by a plurality of fixed speed ratios. Each of the fixed speed ratios is achievable by engaging a particular combination of clutches. An electrically variable transmission includes at least one motor/generator, and is typically characterized by at least one electrically variable mode or range of operation in which the speed ratio between the input shaft and the output shaft is not fixed, but instead varies with the speed of the rotor of the motor/generator. An electrically variable transmission may be configured such that multiple electrically variable modes or ranges are achievable by engaging particular combinations of clutches. Other combinations of clutches in an electrically variable transmission may result in fixed speed ratio modes.

Shifting from a currently established fixed ratio or electrically variable mode to a new fixed ratio or electrically variable mode involves, in most cases, disengaging a clutch (off-going clutch) and engaging another clutch (on-coming clutch). Clutches may be engaged by the action of pressurized fluid against a piston in a clutch apply chamber. Accordingly, transmissions typically include a hydraulic circuit for supplying pressurized fluid to the apply chambers of the clutches.

SUMMARY OF THE INVENTION

A transmission includes first, second, third, and fourth clutches that engage in response to fluid pressure. The transmission also includes a main passage, a first passage, a second passage, and a third passage. A pump is configured to supply fluid pressure to the main passage. A first valve is configured to control fluid communication between the first clutch and the first passage. A second valve is configured to control fluid communication between the second clutch and the second passage. A third valve is configured to control fluid communication between the third clutch and the third passage. A fourth valve is configured to control fluid communication between the fourth clutch and the main passage.

Fifth and sixth valves are configured to control fluid communication between the main passage and the first, second, and third passages such that the fifth and sixth valves selectively provide first, second, and third operating conditions. In the first operating condition, the first passage is not in fluid communication with the main passage and the second and third passages are in fluid communication with the main passage. Accordingly, the first clutch is not engageable in the first operating condition.

In the second operating condition, the second passage is not in fluid communication with the main passage and the first and third passages are in fluid communication with the main passage. Accordingly, the second clutch is not engageable in the second operating condition.

In the third operating condition, the third passage is not in fluid communication with the main passage and the first and second passages are in fluid communication with the main passage. Accordingly, the third clutch is not engageable in the third operating condition.

Thus, in each of the three operating conditions caused by the fifth and sixth valves, a respective clutch is not engageable. Accordingly, the transmission provided may prevent undesired shift sequencing and clutch combinations. In an exemplary embodiment, the default settings of the valves is such that the clutches are engaged in a combination that provides a pre-established transmission mode. Accordingly, in the event of a loss of power to the transmission controller, the transmission will enter the pre-established transmission mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
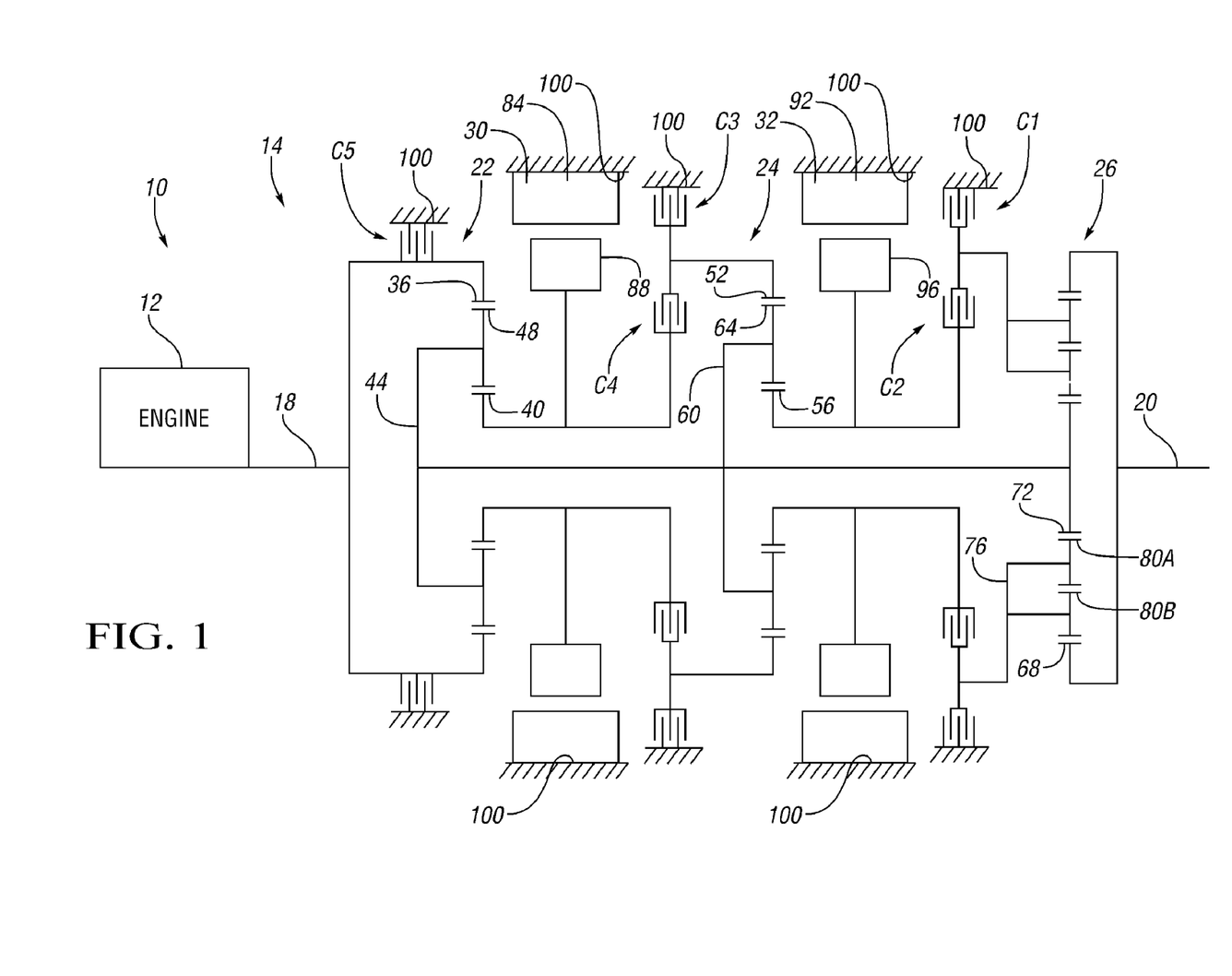
FIG. 1 is a schematic depiction of a powertrain including an electrically variable transmission with a plurality of clutches.

Referring to the drawings wherein like characters represent the same or corresponding parts throughout the several views, there is seen in FIG. 1 a powertrain 10 having an engine 12 and an electrically variable hybrid transmission 14. The engine 12 in one embodiment is a reciprocating, internal combustion engine, and may, for example, be spark ignition or compression ignition. The electrically variable hybrid transmission 14 includes an input shaft 18, an output shaft 20, three planetary gearsets 22, 24, and 26, five torque transmitting mechanisms C1, C2, C3, C4, and C5 (also referred to herein as "clutches"), and two electrical power units or motor/generators 30, 32.

Planetary gearset 22 includes a ring gear member 36, a sun gear member 40, and a planet carrier 44 that rotatably supports a plurality of planet gear members 48. Each of the planet gear members 48 meshingly engages the sun gear member 40 and the ring gear member 36. Planetary gearset 24 includes a ring gear member 52, a sun gear member 56, and a planet carrier 60 that rotatably supports a plurality of planet gear members 64. Each of the planet gear members 64 meshingly engages the sun gear member 56 and the ring gear member 52. Planetary gearset 26 includes a ring gear member 68, a sun gear member 72, and a planet carrier 76 that rotatably supports a plurality of planet gear members 80A, 80B. Each of the planet gear members 80A meshingly engages the sun gear member 72 and a respective one of the planet gear members 80B. Each of the planet gear members 80B meshingly engages the ring gear member 68 and a respective one of the planet gear members 80A.

Motor/generator 30 includes a stator 84 and a rotor 88. Motor/generator 32 includes a stator 92 and a rotor 96. Ring gear member 36 is operatively connected to the input shaft 18 for unitary rotation therewith. Sun gear member 40 is operatively connected to rotor 88 for unitary rotation therewith. Planet carrier 44, planet carrier 60, and sun gear member 72 are operatively interconnected for unitary rotation. Sun gear member 56 is operatively connected to rotor 96 for unitary rotation therewith. The output shaft 20 is operatively connected to ring gear member 68 for unitary rotation therewith.

Clutch C1 is selectively engageable to operatively connect planet carrier 76 to a stationary member such as transmission housing 100. Clutch C2 is selectively engageable to operatively connect planet carrier 76 to rotor 96 and sun gear member 56 for unitary rotation. Clutch C3 is selectively engageable to operatively connect ring gear member 52 to the housing 100. Clutch C4 is selectively engageable to operatively connect ring gear member 52 to sun gear member 40 and rotor 88 for unitary rotation.

Motor/generators 30, 32 are in electrical communication with an energy storage device (not shown) such as a battery or an ultracapacitor, and are controlled by a control unit (not shown).

Figure 2:
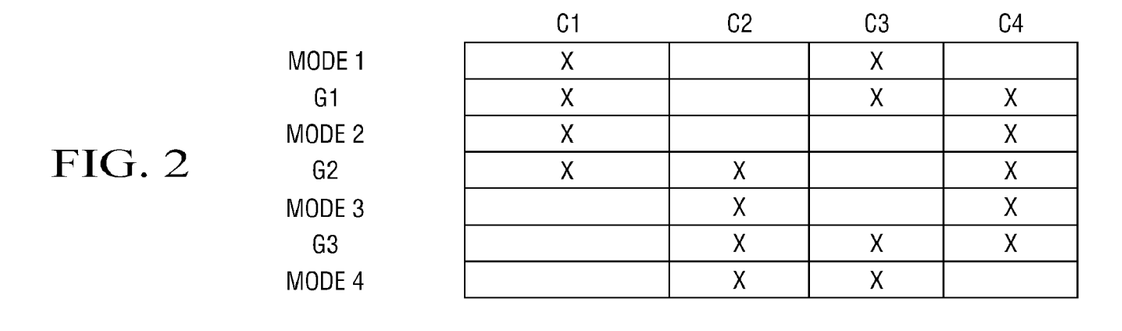
FIG. 2 is a truth table depicting a shift logic for the transmission of FIG. 1.

Referring to FIGS. 1 and 2, the planetary gear arrangement, as shown in FIG. 1, provides four electrically variable modes of operation and three fixed ratio mode of operation. In the four electrically variable modes, the speed ratio between the input shaft 18 and the output shaft 20 is variable and depends on the speed of one or both of the motor/generators 30, 32. In the fixed ratio modes, the speed ratio between the input shaft 18 and the output shaft 20 is fixed. In the first electrically variable mode, i.e., Mode 1, clutches C1 and C3 are engaged, and clutches C2 and C4 are disengaged. In the first fixed ratio mode, i.e., G1, clutches C1, C3, and C4 are engaged, and clutch C2 is disengaged. In the second electrically variable mode, i.e., Mode 2, clutches C1 and C4 are engaged, and clutches C2 and C3 are disengaged. In the second fixed ratio mode, i.e., G2, clutches C1, C2, and C4 are engaged, and clutch C3 is disengaged. In the third electrically variable mode, i.e., Mode 3, clutches C2 and C4 are engaged, and clutches C1 and C3 are disengaged. In the third fixed ratio mode, i.e., G3, clutches C2, C3, and C4 are engaged and clutch C1 is disengaged. In the fourth electrically variable mode, i.e., Mode 4, clutches C2 and C3 are engaged, and clutches C1 and C4 are disengaged.

Figure 3:
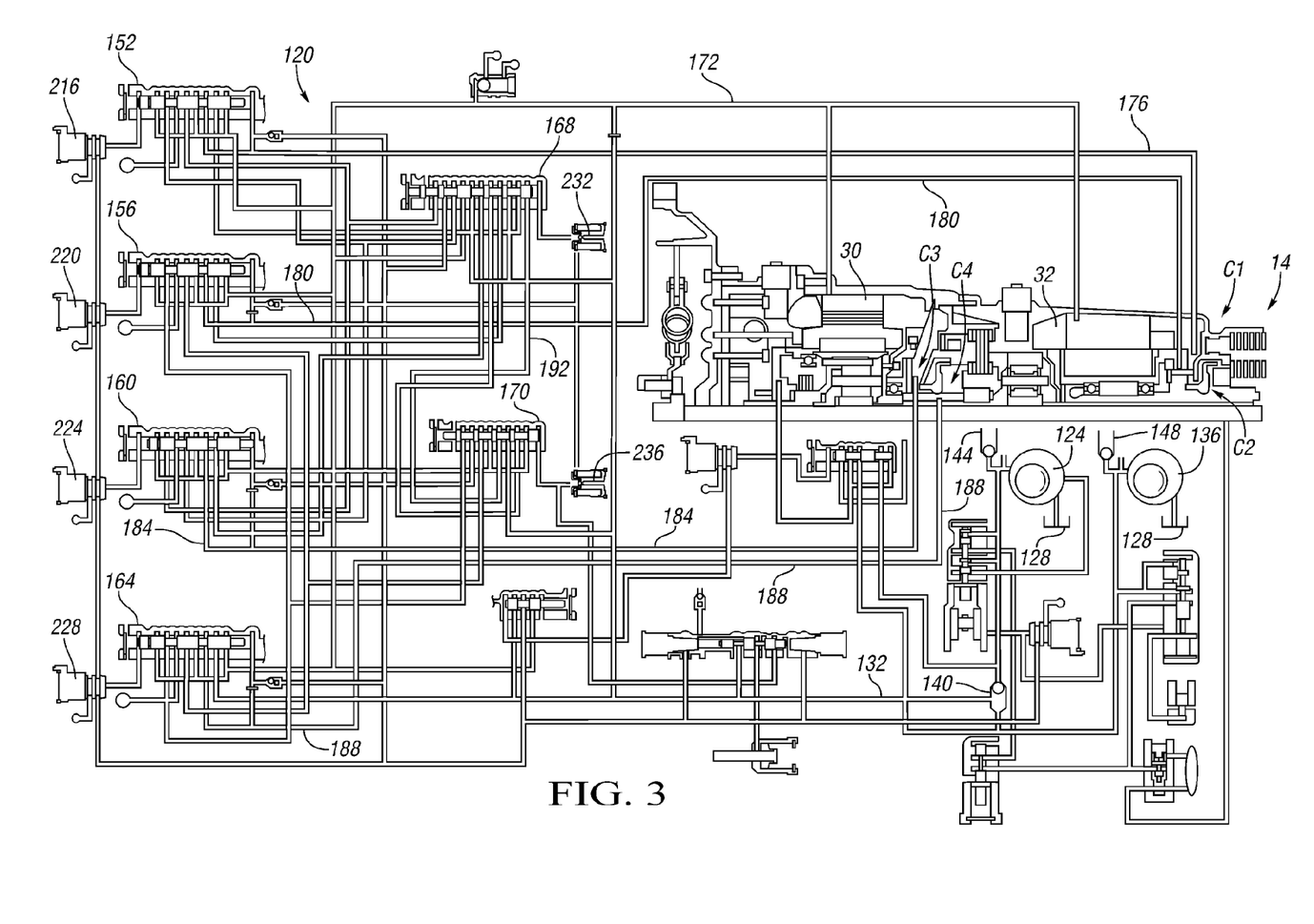
FIG. 3 is a schematic depiction of the hydraulic clutch actuation control system for the transmission of FIG. 1.

Referring to FIG. 3, a hydraulic clutch actuation control system 120 is schematically depicted. The system 120 includes an engine driven hydraulic pump 124, such as a fixed displacement pump, that draws fluid from a reservoir 128 for delivery to a main passage 132. Alternately, an electrically controlled hydraulic pump 136 is provided for operation in an electric mode (i.e., when the engine 12 is not transmitting power to the transmission and only motor/generators 30, 32 provide power). A check valve 140 operates to selectively distribute pressurized fluid to the main passage 132 from one of pumps 124, 136, depending upon which pump 124 or 136 is operating. A pressure relief valve 144 is provided in fluid communication with the outlet of the hydraulic pump 124 to guard against over pressurization of the main passage 132. Likewise, a pressure relief valve 148 is provided in fluid communication with the outlet of the electrically controlled hydraulic pump 136 to guard against over pressurization of the main passage 132. The pressure relief valves 144 and 148 will exhaust fluid though a passage should an over pressurized condition manifest itself within the main passage 132.

The system 120 also includes four trim valves 152, 156, 160, 164 and two shift valves, or blocking valves 168, 170. Each clutch C1, C2, C3, C4 is operatively connected to a respective one of the trim valves 152, 156, 160, 164, which controls the application and release of the clutch. That is, each clutch C1, C2, C3, C4 is applied by the application of hydraulic pressure, as understood by those skilled in the art. Pressurized fluid from the pumps 124, 136 is supplied to valves 164, 168, 170 via main passage 132.

Passage 172 provides fluid communication between each of the valves 152, 156, 160, 164, 168, 170 and the motor/generators 30, 32. Passage 172 functions as backfill and provides cooling to the motor/generators 30, 32. Passage 176 provides fluid communication between valve 152 and clutch C1. Passage 180 provides fluid communication between valve 156 and clutch C2. Passage 184 provides fluid communication between valve 160 and clutch C3. Passage 188 provides fluid communication between valve 164 and clutch C4.

Main passage 132 provides fluid communication between the pumps 124, 136 and valves 164, 168, 170. Accordingly, main passage 132 supplies high pressure fluid from one of pumps 124, 136 (depending on which of the pumps is operating and the status of valve 140) to each of valves 164, 168, 170. Passage 192 provides fluid communication between valve 168 and valve 170. Passage 196 provides fluid communication between valve 168 and valve 152. Passage 200 provides fluid communication between valve 168 and valve 156. Passage 204 provides fluid communication between valve 168 and valve 170. Passage 208 provides fluid communication between valve 168 and valve 160.

Figure 5:
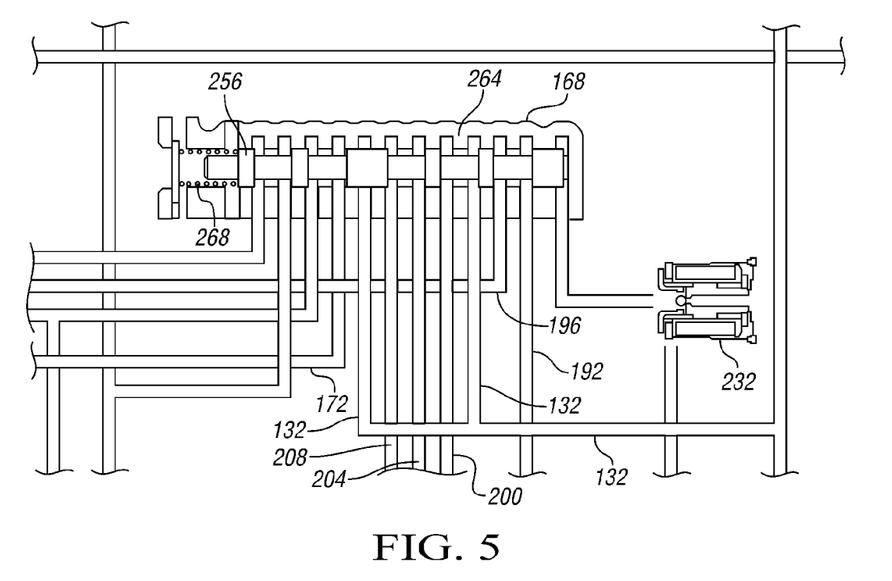
FIG. 5 is a schematic depiction of the first blocking valve of FIG. 4 in a first position.

Each valve 152, 156, 160, 164, 168, 170 includes a respective valve member 240, 244, 248, 252, 256, 260, respectively, that is selectively movable to control which of the various passages connected to each valve are in fluid communication with one another. Referring to FIG. 5, valve 168 includes a valve body 264 defining a cavity in which member 256 is selectively, slidably translatable between first and second positions. Spring 268 biases the valve member 256 in the first position, as shown in FIG. 5. In the first position, member 256 permits fluid communication between passage 192 and passage 196; between passage 132 and passage 200; and between passage 204 and passage 208.

Figure 6:
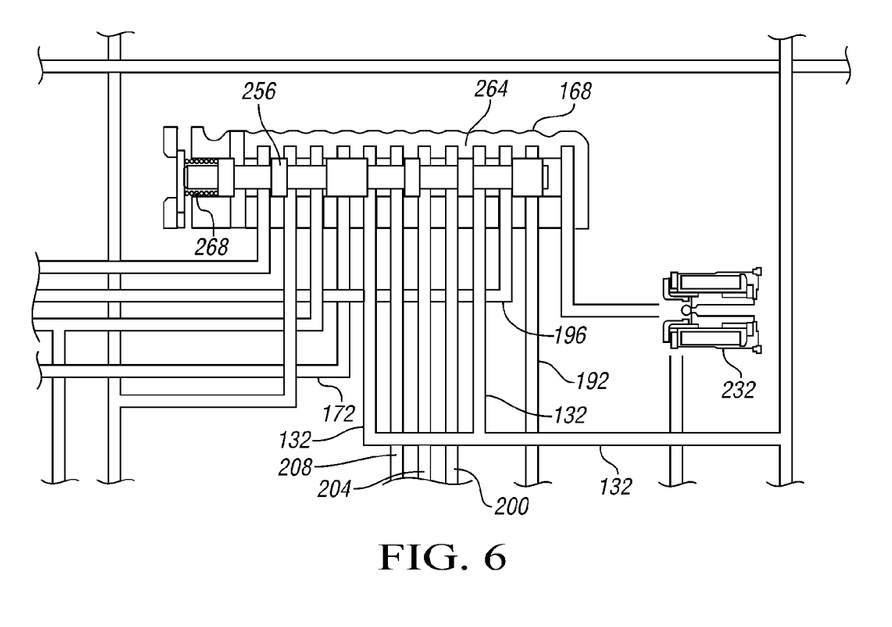
FIG. 6 is a schematic depiction of the first blocking valve of FIG. 4 in a second position.

Member 256 is shown in its second position in FIG. 6. When member 256 is in its second position, member 256 permits fluid communication between passage 196 and passage 132; between passage 200 and passage 204; and between passage 208 and passage 132.

Figure 7:
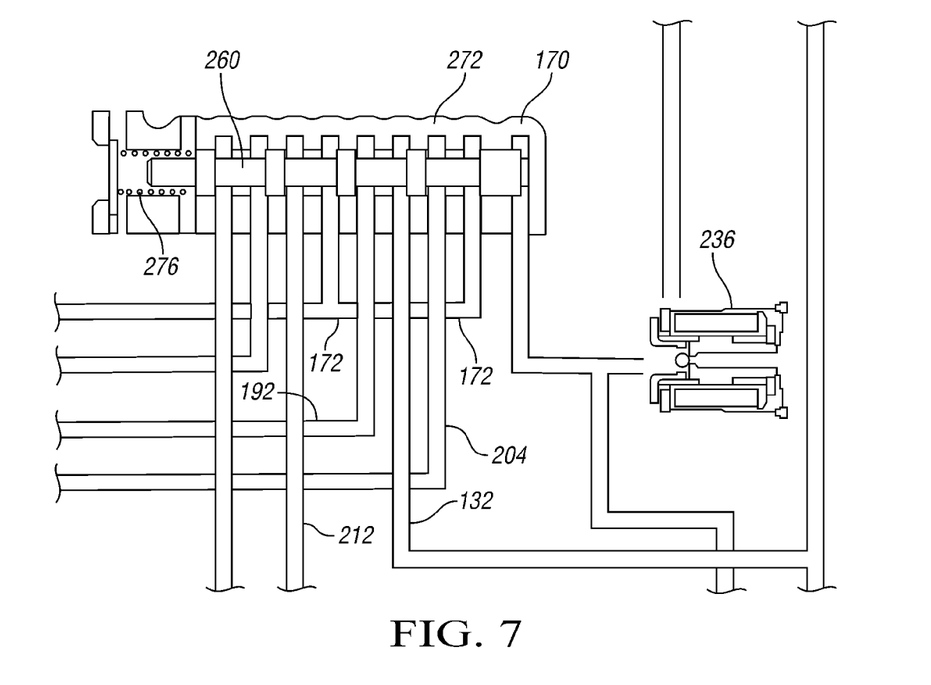
FIG. 7 is a schematic depiction of the second blocking valve of FIG. 4 in a first position.
Figure 8:
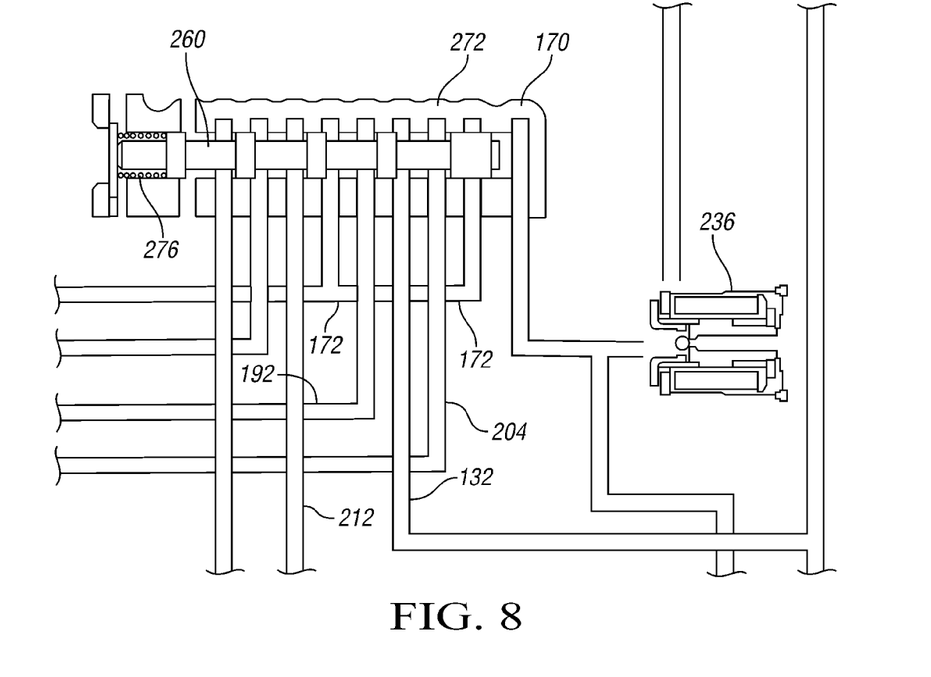
FIG. 8 is a schematic depiction of the second blocking valve of FIG. 4 in a second position.

Referring to FIG. 7, valve 170 includes a valve body 272 defining a cavity in which member 260 is selectively, slidably translatable between first and second positions. Spring 276 biases the valve member 260 in the first position, as shown in FIG. 7. In the first position, member 260 permits fluid communication between passage 172 and passage 204; between passage 132 and passage 192; and between passage 172 and passage 212. Member 260 is shown in its second position in FIG. 8. In its second position, member 260 permits fluid communication between passage 204 and passage 132; and between passage 192 and passage 172.

Referring again to FIG. 4, member 240 is selectively movable within the body of valve 152 between a first position in which the member 240 obstructs fluid communication between passage 176 and passage 196, and a second position in which the member 240 permits fluid communication between passage 176 and passage 196. A spring biases the member 240 in its first position. Member 244 is selectively movable within the body of valve 156 between a first position in which the member 244 obstructs fluid communication between passage 180 and passage 200, and a second position in which the member 244 permits fluid communication between passage 180 and passage 200. A spring biases the member 244 in its first position. Member 248 is selectively movable within the body of valve 160 between a first position in which the member 248 obstructs fluid communication between passage 184 and passage 208, and a second position in which the member 248 permits fluid communication between passage 184 and passage 208. A spring biases the member 248 in its first position. Member 252 is selectively movable within the body of valve 164 between a first position in which the member 252 obstructs fluid communication between passage 188 and passage 132, and a second position in which the member 252 permits fluid communication between passage 188 and passage 132. A spring biases the member 252 in its first position. In their respective first positions, each of members 240, 244, 248, 252 provide fluid communication between a respective one of passages 176, 180, 184, 188 and backfill (exhaust) passage 172.

Figure 4:
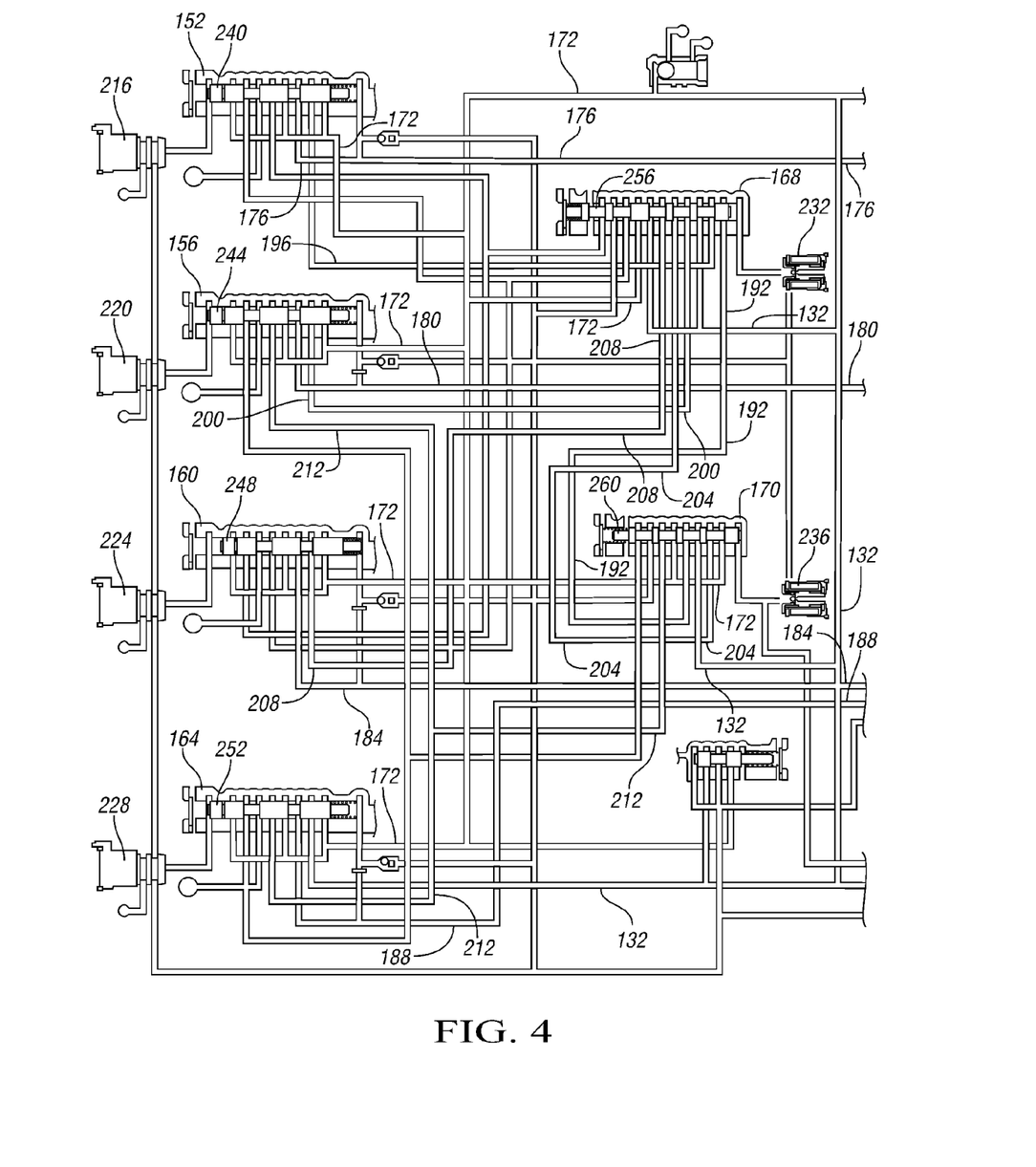
FIG. 4 is a schematic depiction of a portion of the hydraulic clutch actuation control system of FIG. 3, including four trim valves and first and second blocking valves.

The system 120 also includes six solenoid valves 216, 220, 224, 228, 232 and 236. Each solenoid valve is operative to control fluid pressure exerted on a respective one of members 240, 244, 248, 252, 256, 260. Each of the solenoid valves 216, 220, 224, 228, 232 and 236, when open (or high), permits fluid pressure to act on a respective one of members 240, 244, 248, 252, 256, 260 to move the respective member to its second position. Each of the solenoid valves 216, 220, 224, 228, 232 and 236, when closed (or low) does not permit sufficient pressure to act against a respective one of members 240, 244, 248, 252, 256, 260 to overcome the spring bias and the respective member remains in its first position.

Solenoid valves 232, 236 are on/off type solenoid valves, and solenoid valves 216, 220, 224, 228 are variable pressure (proportional control) type solenoid valves. Solenoid valves 216, 224, 232, and 236 are normally low or normally closed type solenoid valves, and solenoid valves 220, 228 are normally high or normally open type solenoid valves. A normally open (or normally high) solenoid valve will distribute pressurized fluid or an output pressure when not energized (in the absence of an electrical signal to the solenoid). A normally low (or normally closed) solenoid valve does not supply pressure when not energized. As used herein, the default state of a valve 152, 156, 160, 164, 168, 170 corresponds to the position of the valve member 240, 244, 248, 252, 256, 260 when the corresponding solenoid valve 216, 220, 224, 228, 232, 236 is not energized.

Figure 9:
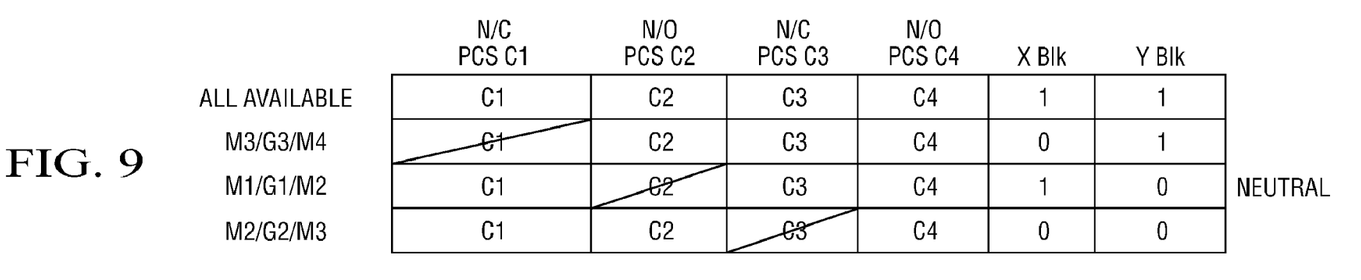
FIG. 9 is a truth table depicting the availability of the clutches of FIG. 1 during various states of the blocking valves.

Referring to FIGS. 4 and 9, there are four possible operating configurations of blocking valves 168 and 170, which are determined by the activation status of the solenoid valves 232, 236. The four possible operating configurations of blocking valves 168, 170 result in four transmission operating conditions, each having a different availability of clutches C1-C4.

In FIG. 9, the status of solenoid valve 232 is depicted in the column labeled "X Blk" and the status of solenoid valve 236 is depicted in the column labeled "Y Blk." The numeral "1" indicates that the solenoid valve is activated or energized, and the number "0" indicates that the solenoid valve is deactivated, or not energized.

In a first operating configuration, as depicted in the first row of the table of FIG. 9, both solenoid valves 232, 236 are energized and therefore members 256, 260 are in their respective second positions. In a second operating configuration, as depicted in the second row of the table of FIG. 9, solenoid valve 232 is not energized and solenoid valve 236 is energized, and therefore member 256 is in its first position and member 260 is in its second position. In a third operating configuration, as depicted in the third row of the table of FIG. 9, solenoid valve 232 is energized and solenoid valve 236 is not energized, and therefore member 256 is in its second position and member 260 is in its first position. In a fourth operating configuration, as depicted in the fourth row of the table of FIG. 9, both solenoid valves 232, 236 are not energized, and therefore members 256, 260 are in their respective first positions.

Clutch C1 is engageable only if sufficient fluid pressure is present in passage 196. Clutch C2 is engageable only if sufficient fluid pressure is present in passage 200. Clutch C3 is engageable only if sufficient fluid pressure is present in passage 208. Sufficient fluid pressure is obtained in a passage 196, 200, 208 by providing fluid communication between the passage 196, 200, 208 and the main passage 132. The presence of sufficient fluid pressure in passages 196, 200, 208 is dependent upon the status of the blocking valves 168, 170. Thus, the availability of any of the electrically variable modes and the fixed ratio modes is dependent upon the status of the blocking valves 168, 170. Clutch C4 is engageable independent of the status of blocking valves 168, 170, because valve 164 is in direct fluid communication with main passage 132 and can provide fluid communication between main passage 132 and the clutch C4 via passage 188. More specifically, valve 164 provides direct fluid communication between passage 188 and the main passage 132 when member 252 is in its second position, and therefore the application of clutch C4 is not dependent upon the status of the blocking valves 168, 170.

In the first operating configuration, pressurized fluid from the pumps 124, 136 is available to all of valves 152, 156, 160, and 164 (i.e., all of valves 152, 156, 160, 164 are in fluid communication with the main passage 132). Accordingly, all of the clutches C1-C4 are engageable, and therefore all electrically variable and fixed ratio modes are available. More specifically, in the first operating configuration, passage 196 is in fluid communication with the main passage 132 via valve 168, and therefore pressure is available to clutch C1. Passage 200 is in fluid communication with main passage 132 via valve 168, passage 204, and valve 170, and therefore pressure is available to clutch C2. Passage 208 is in fluid communication with main passage 132 via valve 168, and therefore pressure is available to clutch C2.

In the second operating configuration, clutch C1 is not available because passage 196 is not in fluid communication with the main passage 132. Accordingly, only Mode 3, G3, and Mode 4 are possible in the second operating configuration. With member 260 in its second position and member 256 in its first position, passage 200 is in fluid communication with the main passage 132 via valve 168, and passage 208 is in fluid communication with the main passage 132 via valve 168, passage 204, and valve 170. Passage 196 is in fluid communication with the backfill passage 172 (and therefore not sufficiently pressurized) via valve 168, passage 192, and valve 170.

In the third operating configuration, clutch C2 is not available because passage 200 is not in fluid communication with the main passage 132. Accordingly, only Mode 1, G1, and Mode 2 are possible in the third operating configuration. With member 256 in its second position and member 260 in its first position, passage 196 is in fluid communication with main passage 132 via valve 168, and passage 208 is in fluid communication with main passage 132 via valve 168. Passage 200 is in fluid communication with the backfill passage 172 (and therefore not sufficiently pressurized) via valve 168, passage 204, and valve 170.

In the fourth operating configuration, clutch C3 is not available because passage 208 is not in fluid communication with the main passage 132. Accordingly, only Mode 2, G2, and Mode 3 are possible in the fourth operating configuration. With members 256, 260 in their respective first positions, passage 196 is in fluid communication with main passage 132 via valve 168, passage 192, and valve 170; passage 200 is in fluid communication with main passage 132 via valve 168. Passage 208 is in fluid communication with the backfill passage 172 (and therefore not sufficiently pressurized) via valve 168, passage 204, and valve 170.

The concurrent application of clutches C1, C2, and C3 may cause the transmission 14 to lock up, and therefore it is desirable to avoid the condition in which all of clutches C1, C2, and C3 are applied. By operating the transmission 14 only in the second, third, and fourth operating configurations shown in FIG. 9, all four electrically variable modes and all three fixed ratio modes of transmission operation are usable and the application of clutches C1, C2 and C3 concurrently is not possible.

The four available logic combinations of the two blocking valves 168, 170 thus provide four operating zones (low ranges only, mid ranges only, high ranges only, and all driving ranges available). In the event of power loss to the transmission controller (not shown), two normally high solenoids 220, 228 are used to actuate two clutch control valves 156, 164 to provide the correct combination of clutches to provide EVT MODE 3 operation. During power-off conditions, the blocking valves 168, 170 are mechanized not to block the MODE 3 clutches (i.e., clutch C2 and clutch C4). By providing only one blocked clutch in any given operating configuration, all transitions to higher or lower modes can occur with at most a single blocking valve transition.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   first, second, third, and fourth clutches being engageable in response to fluid pressure;
   a main passage, a first passage, a second passage, and a third passage;
   a pump configured to supply fluid pressure to the main passage;
   a first valve linking the first clutch and the first passage, and configured to control fluid communication between the first clutch and the first passage;
   a second valve configured to control fluid communication between the second clutch and the second passage;
   a third valve configured to control fluid communication between the third clutch and the third passage;
   a fourth valve configured to control fluid communication between the fourth clutch and the main passage; and
   fifth and sixth valves configured to control fluid communication between the main passage and the first, second, and third passages such that the fifth and sixth valves selectively provide
      a first operating condition in which the first passage is not in fluid communication with the main passage and the second and third passages are in fluid communication with the main passage,
      a second operating condition in which the second passage is not in fluid communication with the main passage and the first and third passages are in fluid communication with the main passage, and
      a third operating condition in which the third passage is not in fluid communication with the main passage and the first and second passages are in fluid communication with the main passage.

2. The transmission of claim 1, further comprising a fourth passage providing fluid communication between the fifth valve and the sixth valve; and
   a fifth passage providing fluid communication between the fifth valve and the sixth valve.

3. The transmission of claim 2, wherein the fifth valve is characterized by a first state in which the first passage is in fluid communication with the fifth passage at the fifth valve, the second passage is in fluid communication with the main passage at the fifth valve, and the third passage is in fluid communication with the fourth passage at the fifth valve;
   wherein the fifth valve is characterized by a second state in which the first passage is in fluid communication with the main passage at the fifth valve, the second passage is in fluid communication with the fourth passage at the fifth valve, and the third passage is in fluid communication with the main passage at the fifth valve;
   wherein the sixth valve is characterized by a first state in which the sixth valve provides fluid communication between the fifth passage and the main passage and does not provide fluid communication between the fourth passage and the main passage; and
   wherein the sixth valve is characterized by a second state in which the sixth valve provides fluid communication between the fourth passage and the main passage and does not provide fluid communication between the fifth passage and the main passage.

4. The transmission of claim 3, further comprising an input member;
   an output member;
   first and second motor/generators;
   wherein the first, second, third, and fourth clutches are selectively engageable such that the transmission is characterized by four electrically variable modes in which the speed ratio between the input member and the output member depends on the speed of at least one of the first and second motor/generators, and three fixed ratio modes in which the speed ratio between the input member and the output member is fixed.

5. The transmission of claim 4, wherein the first, second, third, fourth, fifth, and sixth valves are characterized by respective default states; and wherein the transmission is in one of the electrically variable modes when the first, second, third, fourth, fifth, and sixth valves are in their respective default states.

6. The transmission of claim 5, further comprising first, second, and third planetary gearsets having respective first, second, and third members;
   a stationary member;

the first member of the first gearset being operatively connected to the input member for rotation therewith;

the second member of the first gearset, the first member of the second gearset, and the first member of the third gearset being operatively connected to each other for rotation therewith;

the third member of the first gearset being operatively connected to the first rotor for rotation therewith;

the second member of the second gearset being operatively connected to the second rotor for rotation therewith; and the second member of the third gearset being operatively connected to the output member for rotation therewith;

wherein the first clutch is configured to selectively couple the third member of the third gearset to the stationary member;

wherein the second clutch is configured to selectively couple the third member of the third gearset to the second rotor and the second member of the second gearset for rotation therewith;

wherein the third clutch is configured to selectively couple the third member of the second gearset to the stationary member; and wherein the fourth clutch is configured to selectively couple the third member of the second gearset to the first rotor and the third member of the first gearset for rotation therewith.

7. A transmission comprising:

first, second, third, and fourth clutches being engageable in response to fluid pressure;

a main passage;

a pump configured to supply fluid pressure to the main passage;

first, second, third, fourth, and fifth passages;

a first valve having a first member being selectively movable between a first position in which the first valve prevents fluid communication between the first clutch and the first passage, and a second position in which the first valve permits fluid communication between the first clutch and the first passage;

a second valve having a second member being selectively movable between a first position in which the second valve prevents fluid communication between the second clutch and the second passage, and a second position in which the second valve permits fluid communication between the second clutch and the second passage;

a third valve having a third member being selectively movable between a first position in which the third valve prevents fluid communication between the third clutch and the third passage, and a second position in which the third valve permits fluid communication between the third clutch and the third passage;

a fourth valve having a fourth member being selectively movable between a first position in which the fourth valve prevents fluid communication between the fourth clutch and the main passage, and a second position in which the fourth valve permits fluid communication between the fourth clutch and the main passage; and a fifth valve having a fifth valve member being selectively movable between first and second positions; and a sixth valve having a sixth valve member being selectively movable between first and second positions;

wherein the first passage is in fluid communication with the fifth passage at the fifth valve, the second passage is in fluid communication with the main passage at the fifth valve, and the third passage is in fluid communication with the fourth passage at the fifth valve when the fifth member is in its first position;

wherein first passage is in fluid communication with the main passage at the fifth valve, the second passage is in fluid communication with the fourth passage at the fifth valve, and the third passage is in fluid communication with the main passage at the fifth valve when the fifth member is in its second position;

wherein the sixth valve provides fluid communication between the fifth passage and the main passage and does not provide fluid communication between the fourth passage and the main passage when the sixth member is in its first position; and wherein the sixth valve provides fluid communication between the fourth passage and the main passage and does not provide fluid communication between the fifth passage and the main passage when the sixth member is in its second position.

8. The transmission of claim 7, wherein the first, second, third, fourth, fifth, and sixth members are spring-biased toward their respective first positions;

wherein the transmission further comprises a first solenoid valve configured to control fluid pressure to the first member;

a second solenoid valve configured to control fluid pressure to the second member;

a third solenoid valve configured to control fluid pressure to the third member;

a fourth solenoid valve configured to control fluid pressure to the fourth member;

a fifth solenoid valve configured to control fluid pressure to the fifth member;

a sixth solenoid valve configured to control fluid pressure to the sixth member; and wherein each of the first, second, third, fourth, fifth, and sixth members is responsive to fluid pressure from the corresponding solenoid valve by moving from its respective first position to its respective second position.

9. The transmission of claim 8, wherein the first, third, fifth, and sixth solenoid valves are closed when unenergized; and wherein the second and fourth solenoid valves are open when unenergized.

10. The transmission of claim 9, further comprising:

an input member, an output member, and a stationary member;

first and second motor/generators;

first, second, and third planetary gearsets having respective first, second, and third members;

the first member of the first gearset being operatively connected to the input member for rotation therewith;

the second member of the first gearset, the first member of the second gearset, and the first member of the third gearset being operatively connected to each other for rotation therewith;

the third member of the first gearset being operatively connected to the first rotor for rotation therewith;

the second member of the second gearset being operatively connected to the second rotor for rotation therewith; and the second member of the third gearset being operatively connected to the output member for rotation therewith;

wherein the first clutch is configured to selectively couple the third member of the third gearset to the stationary member;

wherein the second clutch is configured to selectively couple the third member of the third gearset to the sec ond rotor and the second member of the second gearset for rotation therewith;

wherein the third clutch is configured to selectively couple the third member of the second gearset to the stationary member; and wherein the fourth clutch is configured to selectively couple the third member of the second gearset to the first rotor and the third member of the first gearset for rotation therewith.

\* \* \* \* \*